Aug. 22, 1967  O. R. KUSTER  3,337,307
RECOVERY OF SULFUR PRECIPITATE FROM A HYDROCARBON SOLVENT
BY EXTRACTION WITH A COLD IMMISCIBLE FLUID
Filed Oct. 19, 1964
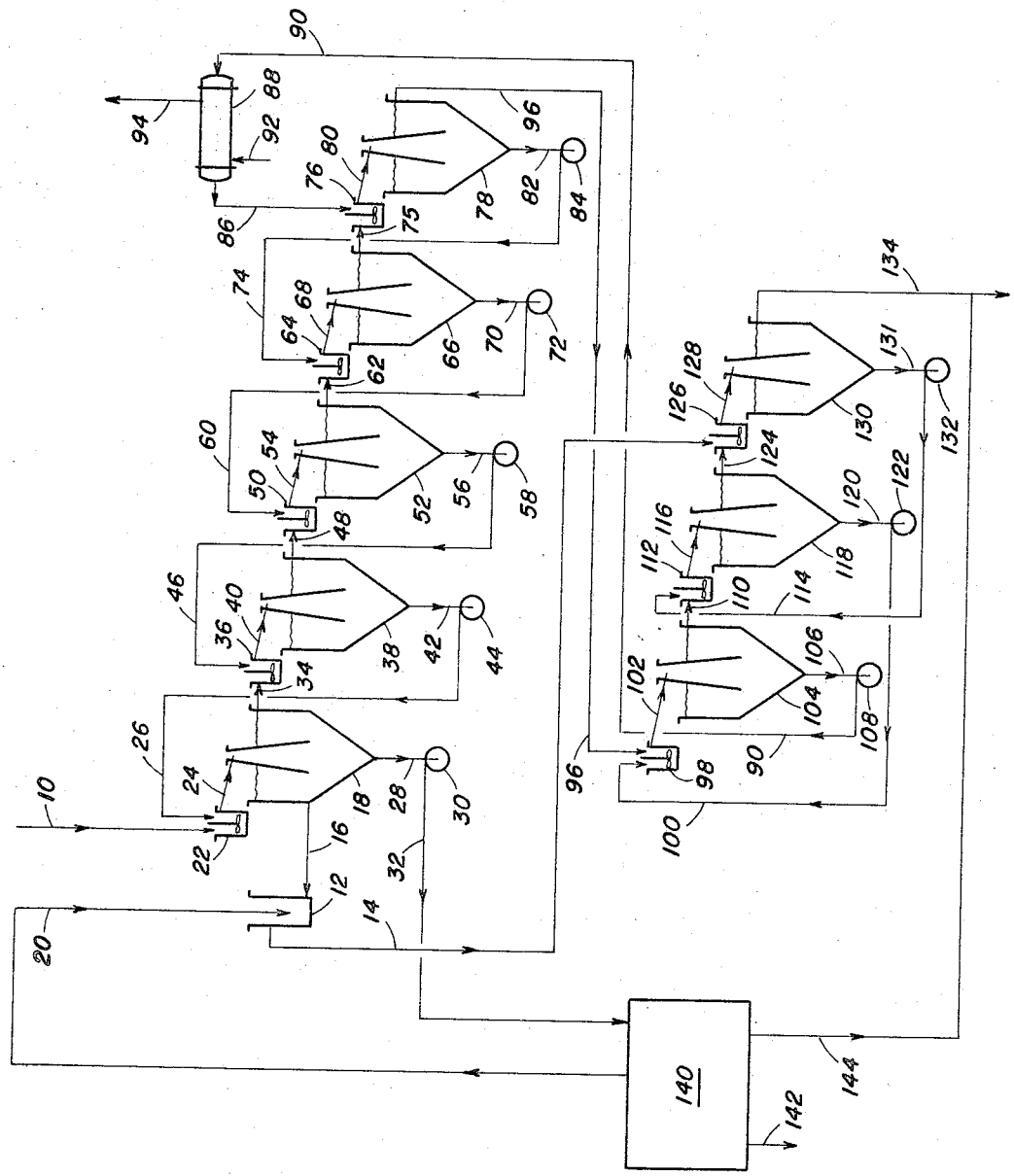
INVENTOR
Otto R. Kuster
BY
Flynn, Marn & Jangarathis
ATTORNEY

United States Patent Office 3,337,307
Patented Aug. 22, 1967

3,337,307
RECOVERY OF SULFUR PRECIPITATE FROM A HYDROCARBON SOLVENT BY EXTRACTION WITH A COLD IMMISCIBLE FLUID
Otto R. Kuster, Boca Raton, Fla., assignor to The Lummus Company, New York, N.Y., a corporation of Delaware
Filed Oct. 19, 1964, Ser. No. 404,607
10 Claims. (Cl. 23—312)

This invention relates, in general, to the crystallization of solids from saturated solutions thereof in a plurality of mixing and agitation steps, and more particularly to a process for the crystallization of solids from saturated solution thereof wherein a neutral liquid of lower temperature is employed to precipitate the crystals from the solution, said liquid being substantially insoluble in the saturated, mother liquor. The invention finds application in the crystallization of sulfur, potassium chloride, and the like from various liquid hydrocarbons which are not soluble in water, water being used as the liquid cooling medium. The process of the invention is characterized by lower fuel costs, as compared to processes heretofore in use, larger crystal size, and the avoidance of metallic heat transfer surfaces which must, under conventional conditions, be continuously scraped.

The process of the invention will hereinafter be described with reference to the crystallization of sulfur from a solution of liquid toluene, using water as the immiscible cooling medium. It will be understood, however, that the invention is also applicable to the crystallization of other materials from hydrocarbon solvents with an immiscible coolant being employed.

A very large number of processes have been proposed heretofore for the crystallization of sulfur and like materials from pregnant solutions thereof. For example, it was proposed as early as 1906, in U.S. Patent No. 833,573, to leach sulfur with hot toluene and then effect precipitation of the sulfur by cooling the toluene solution. In U.S. Patent No. 1,497,469, there is a proposed process for leaching sulfur in hot toluene and then precipitating the sulfur in the form of fine crystals by adding thereto quantities of cold toluene. Other forms of heat transfer and other solvents for sulfur are illustrated, for example, in U.S. Patents Nos. 2,234,269 and 2,934,414.

In all of the above-described processes the size of the precipitated crystals is very small, giving rise to certain handling and separation problems, and, moreover, the heating and cooling requirements for the processes must be supplied independently, thereby necessitating the expenditure of a considerable amount of utility energy.

It is thus a general object of the present invention to provide a new and improved process for the recovery of sulfur crystals and like materials from hydrocarbon solutions thereof employing an immiscible cooling medium therefor.

A further object of the present invention is to provide a new and improved process for the recovery of sulfur and like materials from hydrocarbon solutions thereof, wherein the size of the precipitated crystals is considerably larger than has been possible to make heretofore.

A still further object of the present invention is to provide a new and improved process for the recovery of sulfur and like materials from hydrocarbon solutions thereof wherein water is used as an immiscible cooling medium, and wherein the heat absorbed in the coolant during the course of the precipitation is absorbed in the barren mother liquor, thereby recovering a considerable amount of thermal energy which would otherwise have to be supplied from other sources.

Still another object of the present invention is to provide a process for the recovery of sulfur and like materials from hydrocarbon solutions thereof wherein the use of metallic heat exchange surfaces is entirely eliminated.

Various other objects and advantages of the present invention will become clear in the course of the following description of and embodiment thereof, and the novel features will be particularly pointed out with reference to the appended claims.

In essence, the present invention comprises crystallizing solids from a saturated solution in a plurality of mixing and agitation steps wherein a neutral, immiscible liquid of lower temperature is mixed with the motor liquid, the precipitated crystals being insoluble in the coolant liquid and the pregnant liquor and the coolant liquor being insoluble in each other. After the coolant liquid has absorbed heat from the pregnant liquor and has been separated from the precipitated crystals, it is passed in direct heat exchange relation with the barren mother liquor, thus transferring a substantial part of its heat content to the mother liquor which is then recycled to the leaching stage. The necessary temperature difference between the mother liquor and the cooling liquor is maintained by removing part of the absorbed heat from the cooling medium in a separate cooling step.

In accordance with the invention, a saturated solution of hot toluene and sulfur is supplied to a mechanically agitated mixing tank together with a slurry of water and precipitated sulfur from the next to the last crystallization stage. Overflow from the first mixing tank is supplied to the last crystallization stage wherein precipitated sulfur, water, and some toluene are removed and separated. In this final separation, sulfur is removed as a product, water is recycled as indicated hereinbelow, and toluene is recycled to solvent storage. In the last crystallization stage, as with the other crystallization stages, the solution of toluene and dissolved sulfur concentrates at the top of the crystallizer, and the crystals of precipitated sulfur, being heavier, collect at the bottom of the crystallizer, in the water in which they are insoluble. Overflow from the last crystallizer passes to the second mechanically agitated mixing tank wherein the solution is mixed with a slurry of sulfur crystals and water from the next downstream crystallizer; overhead from the second mixing tank passes to the next crystallizer where the same action as described in the first crystallizer takes place, i.e., the underflow, being a slurry of water and sulfur crystals is piped to the first mixing tank and the overflow passes to the third mixing tank. In this manner, the toluene-sulfur solution passes countercurrently to a water-sulfur crystal slurry in a plurality of mixing and crystallization stages. In these stages, the toluene-sulfur solution is progressively cooled while the sulfur-water slurry is progressively heated. The number of mixing and agitation stages that will be desired in any particular installation may be readily determined by one skilled in the art; generally, anywhere from two to ten stages may be employed, in the specific example set forth hereinbelow, five stages are used. In the last mixing tank, there is of course no countercurrent water-sulfur, slurry, and recycle water alone is added. The last mixing tank overflows into the first crystallization stage, and overflow from the first crystallization stage, substantially barren toluene at a relatively low temperature, is passed to the toluene preheating section. It should be pointed out that the terms "mixing tank" and "crystallization stage" are used for convenience, in that crystallization occurs in both units, and settling and separation are prime functions of the so-called crystallizers.

In the toluene preheating section, the same general process units are employed as in the crystallization section, i.e. a plurality of mixing tank-heat exchange units arranged in cascade fashion. Water separated from the product sulfur is passed into the mixing tank preceding the first heat exchange unit and barren toluene solution is passed into the mixing tank preceding the last heat exchange unit. Thus, the first mixing tank receives toluene solution from the crystallization section and water from the underflow of the second heat exchanger unit. Overflow from the first mixing tank passed into the last heat exchanger. Underflow from the last heat exchanger is substantially cool water which is returned to the last mixing stage in the crystallization section, any further temperature decrease required being accomplished by a separate heat exchange system. Overflow from the last heat exchange unit passes to a second mixing tank, wherein it is mixed with underflow from the first heat exchange unit, and overflow from the second mixing tank passes to the second heat exchange unit. As indicated hereinabove, underflow from this heat exchanger is pumped to the first mixing tank and overflow from this unit passes into the last mixing tank where it is mixed with the hot water recovered from the product sulfur. Overflow from the first heat exchange unit is heated, barren toluene solution which is recycled to the leaching stage where it again becomes saturated with sulfur and is returned to the crystallization section.

It can thus be seen that the process of the invention involves the step-wise precipitation of sulfur from a hot toluene solution in a plurality of mixing and crystallization stages, a liquid cooling medium such as water passing countercurrently to the toluene solution and carrying the crystallized sulfur therewith. By carrying out the precipitation in this manner, a considerably larger crystal size of precipitated sulfur is obtained than prior art processes were able to provide. The precipitated sulfur crystals are separated from the hot water and the water is then passed in direct heat exchange relation, in a plurality of mixing and heat exchange zones with the cool, barren toluene solution, thus providing the heat necessary to solubilize additional quantities of sulfur in the leaching stage, and cooling the heated water so as to provide the necessary temperature difference in the crystallization zone. The countercurrent contact of hot water and cooled toluene provides a measure of thermal economy not heretofore available in prior art processes.

It is believed that a better understanding of the process of the invention will be gained by referring to the following specific embodiment thereof, taken in conjunction with the accompanying drawing, which is a simplified schematic flow sheet or flow diagram of the invention as it is applied to the treatment of toluene solutions saturated with sulfur, using water as the immiscible coolant. It is to be understood that the embodiment described is illustrative of the invention only and is not to be interpreted in a limiting sense.

With reference to the drawing, it will be seen that the crystallization zone comprises a plurality of mechanically agitated mixing tanks 22, 36, 50, 64 and 76, which are in series with a plurality of crystallizers 18, 38, 52, 66 and 78. Underflow from each of the crystallizers is pumped to the mixing tank of the preceding stage in pumps 44, 58, 72 and 84; underflow from the last stage crystallizer being pumped by pump 30 to the sulfur separation zone, indicated generally at 140. The barren toluene preheating zone is similar to the crystallization zone and comprises a series of mechanically agitated mixing tanks 98, 112 and 126, feeding a series of heat exchange units 104, 118 and 130.

Saturated toluene solution at an elevated temperature is delivered to the crystallization zone in line 10 and passed into the first mixing tank 22 where it is mixed with a water-sulfur slurry from the downstream crystallizer in line 26. Overflow from mixing tank 22 is passed into crystallizer 18 wherein crystals of sulfur settle to the bottom together with water, and the still-hot toluene solution remains on the top. Underflow from crystallizer 18 passes in line 28 to pump 30 where it is pumped into line 32 to the sulfur separation and recovery zone 140, described hereinbelow. Excess water in crystallizer 18 is removed via line 16 into water overflow tank 12. Overflow from crystallizer 18 passes via line 34 into mixing tank 36 wherein it is again mixed with sulfur-water slurry from line 46. Overflow from this mixing tank passes in line 40 into crystallizer 38. Similarly, in crystallizer 38 a sulfur crystal-water underflow is passed in line 42 to pump 44 and line 26 back to mixing tank 22, and overflow passes in line 48 to mixing tank 50. Sulfur-water slurry in line 60 from the downstream crystallizing stage is there mixed with the still-pregnant toluene solution and passed in line 54 into crystallizer 52. Underflow from crystallizer 52 is removed in line 56 to pump 58 and thence passes in line 46 back to mixing tank 36; overflow from crystallizer 52 passes in line 62 into the fourth mixing tank 64 where it is mixed with the sulfur-water slurry from the first crystallization stage in line 74. Overflow from mixing tank 64 passes by gravity through line 68 and into crystallizer 66. Again, underflow is removed via line 70 to pump 72 and thence passes to the previous mixing tank via line 60. Overflow from crystallizer 66 passes via gravity in line 75 to the final mixing tank 76 where essentially cold water is mixed with it in line 86.

It will be noted that crystallization commences in mixing tank 22 when the pregnant toluene solution is mixed with cooling water. Crystallization is practically completed in mixing tank 76 and finished in settling tank 78.

The first crystal separation occurs in settling tank 18. More sulfur crystals settle out as the toluene becomes cooler in the separators 38, 52, 66, 78.

The crystals travel counter current to the toluene flow via pumps 84, 72, 58, 44 into mixing tank 22 to separator 18 from which the total precipitation from all following settlers is finally discharged by pump 30.

The barren toluene solution, or mother liquor, is removed as overflow from crystallizer 78 in line 96 and is fed into the first mixing tank 98 of the toluene preheating stage.

Mixing tank 98 receives the barren toluene solution at a low temperature, together with underflow heated water from heat exchanger 118 in line 100. Overflow from mixing tank 98 passes in line 102 into heat exchanger 104.

Underflow from heat exchanger 104, comprising water of 113° F. is removed in line 106 and pumped by pump 108 through line 90 into heat exchanger 88 for further cooling to 75° F. to produce the necessary temperature differential between the toluene solution in mixing tank 76 and the cooling water. Heat exchanger 88 is supplied with a separate cooling medium in lines 92 and 94.

In the toluene preheating section, overflow from heat exchanger 104, slightly heated toluene, is passed in line 110 into mixing tank 112, where it is mixed with underflow from heat exchanger 130 in line 114. The toluene-water mixture then passes in line 116 into heat exchanger 118; the underflow passing in lines 120 and 100 and pump 122 to the first mixing tank as indicated hereinabove, and overflow passing in line 124 into mixing tank 126. In mixing tank 126, the now considerably heated toluene is mixed with hot water recovered from the separated sulfur in line 14. The now heated mixture of water and toluene is separated in heat exchanger 130, the underflow water being passed in line 131 and pump 132 back to the second stage mixing tank, and the hot toluene overflow being passed in line 134 back to the leaching stage.

The separation of the crystallized sulfur from the hot solution of water and some toluene is accomplished in a manner known to the art; the necessary processing equipment is indicated generally at 140, and includes cyclones, sulfur boil tanks, thickeners, centrifuges, driers, conveyors and the like. Dry particulate sulfur is removed as product at 142; recovered toluene, still hot, is removed at 144 and returned to line 134 to recycle to the leaching zone, and the recovered water, also hot, is returned in line 20 to water overflow tank 12, from which the toluene preheating stage is supplied in line 14.

It will be obvious to those skilled in the art that other conventional equipment, including vapor lines, valves, surge tanks, and the like, are not included in the drawing and have not been discussed hereinabove for purposes of simplicity and better understanding of the invention; their placement and use will be obvious.

The operation of the process according to the invention may be described as follows. If the flow rate of both liquids is regulated in such a ratio that their mass flow plus their specific heats are equal, and the temperature of the incoming solution is $t_h$ and the temperature of the incoming cooling solution is $t_c$, and the unavoidable temperature difference between the solutions after mixing is $d$, the temperature drop in a system of $n$ stages will be $$\Delta t = \frac{t_h - t_c - d}{1+n} \quad (I)$$

for each stage.

The total cooling $t$ and preheating of the coolant for a system of $n$ stages will be, $$t = n\Delta t \quad (II)$$

$$t = \frac{n(t_h - t_c - d)}{1+n} \quad (III)$$

If the flow of both liquids plus the specific heats thereof is different from unity, or say $m$, then $$m = \frac{L_1 \cdot C_1}{L_2 \cdot C_2} \quad (IV)$$

where, $L_1$ is the mass flow of the hot liquid, $L_2$ is the mass flow of the cooling liquid, and $C_1$ and $C_2$ are the corresponding specific heats. Under the foregoing conditions, the temperature drop of the hot liquid in the first stage $$\Delta t_1 = \frac{t_h - t_c - d}{A} \quad (V)$$

where $A = 1 + m + m^2 + m^3 + \ldots m^n$.

The temperature drop in the other stages will be as follows:

$$\begin{aligned}\Delta t_2 &= m\Delta t_1 \\ \Delta t_3 &= h^2\Delta t_1 \\ \Delta t_4 &= m^3\Delta t_1 \\ \Delta t_5 &= m^4\Delta t_1\end{aligned} \quad (VI)$$

and for a system with $n$ stages:

$$\Delta t_n = m^{n-1}\Delta t_1$$

With the foregoing formulae, one skilled in the art will be able to readily calculate the number of stages required for hot pregnant solutions and cooling liquid solutions of given compositions and temperatures.

Understanding of the invention will be enhanced by referring to the following specific example thereof, which is meant to be illustrative only and is not to be interpreted in a limiting sense.

*Example*

The plant produces 550 pounds per minute of crystallized sulfur by leaching elementary sulfur bearing ore with toluene. Mass flows and temperatures for the crystallization and heat recovery stages are set forth hereinbelow in Tables I and II, followed by figures showing the economies effected by the heat recovery system when employed according to the invention.

TABLE I.—CRYSTALLIZATION

| | Lbs./min. | Temp., °F. |
|---|---|---|
| Input (line 10): | | |
| Toluene | 8,623 | 175 |
| Dissolved sulfur | 800 | 175 |
| Total pregnant solution | 9,423 | |
| Outputs: | | |
| Barren toluene (line 96) | 8,457 | 94 |
| Dissolved sulfur (line 96) | 250 | 94 |
| Sulfur crystals (line 28) | 535 | 156 |
| Toluene (line 28) | 166 | 156 |
| Dissolved sulfur (line 28) | 15 | 156 |
| Total outputs | 9,423 | |
| Cooling Water: | | |
| For crystallization (line 86) | 3,350 | 75 |
| Make up (line 20) | 550 | 200 |
| Total input | 3,900 | |
| Overflow (line 16) | 2,800 | 156 |
| Make up (line 20) | 550 | 200 |
| Total for heat recovery (line 14) | 3,350 | 163 |
| Water in crystal slurry (line 28) | 550 | 156 |
| Total | 3,900 | |

TABLE II.—HEAT RECOVERY

| | Lbs./min. | Temp., °F. |
|---|---|---|
| Toluene flow: | | |
| Input (line 96): | | |
| Toluene | 8,457 | 94 |
| Sulfur | 250 | 94 |
| Output (line 134): | | |
| Toluene | 8,457 | 143 |
| Sulfur | 250 | 143 |
| Water flow: | | |
| Input (line 14) | 3,350 | 163 |
| Output (line 106) | 3,350 | 113 |

Without the heat recovery system, the 8707 lbs./min. of toluene mother-liquor would have to be preheated from 94° to 175° F., a temperature difference of 81° F., prior to recycling. With the heat recovery system, the temperature of the mother-liquor is raised to 143° F., and has to be increased only by 32° F., thus saving $$\frac{32}{81} \times 100 = 39\% \text{ on B.t.u.'s}$$

For the plant of the example producing 550 lbs./min of sulfur, a saving of about 1500 gallons of fuel oil per day can be expected. This can be calculated as follows:

| | B.t.u. °F. |
|---|---|
| 8457 lbs./min. of toluene, spec. heat 0.38 | 3220 |
| 250 lbs./min. of sulfur, spec. heat 0.18 | 45 |
| Total | 3265 |

Temperature increase recovered = 32° F.
Daily operating time 24 hours = 1440 min.
Heating value of fuel oil = 146,000 B.t.u./gallon
Overall efficiency of combined steam boiler, piping and heat exchanger system = 0.7

From the above, the resulting saving becomes:

$$\frac{3265 \times 1440 \times 32}{146,000 \times 0.7} = 1472 \text{ gal./day of fuel oil}$$

It will be understood that various changes in the details, steps, materials, and arrangements of parts may be made by those skilled in the art without departing from the scope of the invention, as defined in the appended claims.

What is claimed is:
1. Process for the precipitation and recovery of sulfur from hot hydrocarbon solutions thereof comprising:
   (a) passing said hot solution countercurrently in direct heat exchange with a cold liquid, which liquid is immiscible in said hydrocarbon and in which sulfur is substantially insoluble, in a plurality of stages; sulfur being crystallized from the solution in said stages, the sulfur crystals and liquid being separated from the solution before being passed to a next stage;

(b) recovering relatively cool, substantially barren hydrocarbon from the last of said stages;

(c) recovering a slurry of relatively hot liquid and sulfur crystals from the first of said stages;

(d) separating and recovering said sulfur from said hot liquid as product;

(e) passing said hot liquid and said cool hydrocarbon countercurrently in direct contact heat exchange, whereby said hydrocarbon is heated and said liquid is cooled;

(f) recycling said cooled liquid to step (a); and (g) leaching additional quantities of sulfur with said hot hydrocarbon.

2. The process as claimed in claim 1, wherein each of said heat exchange stages in step (a) comprises mixing said hot solution and said liquid, together with any precipitated sulfur, followed by settling and separation thereof, said hot solution being withdrawn as an overflow and said liquid and precipitated sulfur being withdrawn as an underflow.

3. The process as claimed in claim 1, wherein each of said heat exchange stages in step (e) comprises mixing said hot liquid and said cool hydrocarbon, followed by settling and separation thereof, said hot liquid being withdrawn as an underflow and said cool hydrocarbon being withdrawn as an overflow.

4. The process as claimed in claim 3 wherein the mixing of steps (a) and (e) is effected with agitation.

5. The process as claimed in claim 1, and additionally comprising further cooling said cooled liquid by indirect heat exchange with a cooling medium after step (e) and before step (f).

6. The process as claimed in claim 1, wherein said cold liquid is water.

7. The process as claimed in claim 1, wherein said hydrocarbon is toluene.

8. Continuous process for the precipitation and recovering of sulfur from hot pregnant toluene solutions thereof comprising:

(a) passing said pregnant solution countercurrently in direct heat exchange relation with cold water in a plurality of stages, each of said stages comprising mixing the pregnant solution with said water, and any precipitated sulfur, followed by settling and separation thereof, said water and sulfur being withdrawn as an underflow and said toluene solution being withdrawn as an overflow;

(b) recovering relatively cool, substantially barren toluene from the last of said stages;

(c) recovering a slurry of relatively hot water and sulfur crystals from the first of said stages;

(d) separating and recovering said sulfur from said water as product;

(e) passing said water and said toluene countercurrently in direct contact heat exchange in a plurality of stages, thereby cooling said water and heating said toluene;

(f) recycling said cooled water for use in step (a);

(g) leaching additional quantities of sulfur in said hot toluene, thereby producing additional quantities of said hot, pregnant toluene solution; and (h) passing said pregnant solution to step (a).

9. The process as claimed in claim 8 wherein the mixing of step (a) is effected with agitation.

10. A process for the recovery of sulfur dissolved in a hot hydrocarbon solvent comprising: introducing the hot solvent into a first stage of a plurality of sulfur recovery stages, introducing a cold liquid which is immiscible with said hydrocarbon and in which sulfur is substantially insoluble into the last of the plurality of recovery stages, passing the hot solvent from the first recovery stage through the recovery stages to the last recovery stage, passing the cold liquid from the last of the recovery stages through the recovery stages to the first recovery stage, said solvent and said liquid being passed in direct contact with each other in the recovery stages, thereby cooling the solvent, heating the liquid and crystallizing sulfur from the solvent, the liquid and sulfur crystals being separated from the solvent in the recovery stages and the liquid and sulfur crystals being passed to a next recovery stage in the direction of the first recovery stage and the solvent being passed to a next recovery stage in the direction of the first recovery stage, recovering sulfur crystals from the hot liquid from the first recovery stage, passing hot liquid from the first recovery stage into a first stage of a plurality of heat transfer stages, passing cool solvent from the last of the recovery stages to a last stage of the heat transfer stages, passing the hot liquid from the first stage of the heat transfer stages through the heat transfer stages to the last heat transfer stage, passing the cool solvent from the last of the heat transfer stages through the heat transfer stages to the first heat transfer stage, said solvent and liquid being passed in direct contact with each other in the heat transfer stages, thereby cooling the liquid and heating the solvent, the liquid and solvent being separated from each other in the heat transfer stages, the liquid being passed to a next heat transfer stage in the direction of the last heat transfer stage, the solvent being passed to a next heat transfer stage in the direction of the first heat transfer stage, passing hot solvent from the first heat transfer stage to leaching additional sulfur and passing cool liquid from the last heat transfer stage to the last recovery stage.

References Cited

UNITED STATES PATENTS

| | | | |
|---|---|---|---|
| 2,785,059 | 3/1957 | McDonald | 23—312 |
| 2,890,941 | 6/1959 | Bartlett | 23—299 |
| 2,897,065 | 7/1959 | Capell | 23—312 |
| 3,042,503 | 7/1962 | Tuller | 23—312 |

FOREIGN PATENTS 858,056   1/1961   Great Britain.

NORMAN YUDKOFF, *Primary Examiner.*

G. P. HINES, *Assistant Examiner.*